(No Model.)  5 Sheets—Sheet 1.

W. S. & M. C. COOK.
ELECTRIC RAILWAY SIGNAL.

No. 446,546.  Patented Feb. 17, 1891.

(No Model.) 5 Sheets—Sheet 3.

W. S. & M. C. COOK.
ELECTRIC RAILWAY SIGNAL.

No. 446,546. Patented Feb. 17, 1891.

(No Model.) 5 Sheets—Sheet 4.

W. S. & M. C. COOK.
ELECTRIC RAILWAY SIGNAL.

No. 446,546. Patented Feb. 17, 1891.

(No Model.) 5 Sheets—Sheet 5.

W. S. & M. C. COOK.
ELECTRIC RAILWAY SIGNAL.

No. 446,546. Patented Feb. 17, 1891.

UNITED STATES PATENT OFFICE.

WILLIAM S. COOK AND MOSES CHALMER COOK, OF SOUTH OMAHA, NEBRASKA.

ELECTRIC RAILWAY-SIGNAL.

SPECIFICATION forming part of Letters Patent No. 446,546, dated February 17, 1891.

Application filed November 15, 1889. Serial No. 330,414. (No model.)

*To all whom it may concern:*

Be it known that we, WILLIAM S. COOK and MOSES CHALMER COOK, of South Omaha, in the county of Douglas and State of Nebraska, have invented certain new and useful Improvements in Electric Railway-Signals; and we do hereby declare that the following is a full, clear, and exact description of the invention, which will enable others skilled in the art to which it appertains to make and use the same, reference being had to the accompanying drawings, and to the letters and figures of reference marked thereon, which form part of this specification.

Our invention relates to certain improvements in electric railway signal and telegraphing systems.

The objects of the invention are to provide an electric system of danger-signaling for railways, whereby the engineer of an approaching train will be notified of danger by collision, misplaced switches, land-slides, open or destroyed bridges, stray or derailed cars, &c., in time to stop his train before it is too late; also, to provide a system perfect and complete and improved in all details, overcoming grave defects of the electric danger-signal systems heretofore employed; also, to provide an improved system of telegraphing or signaling from one train to another or from a train to a station. These objects are accomplished by and our invention consists in certain novel features of construction and in combinations of parts, more fully described hereinafter, and particularly pointed out in the claims.

Referring to the accompanying drawings.

In the drawings, the reference-letter *a* indicates a railroad-track, and *b* and *c*, respectively, a locomotive and telegraphing-car.

Figures 5, 11:
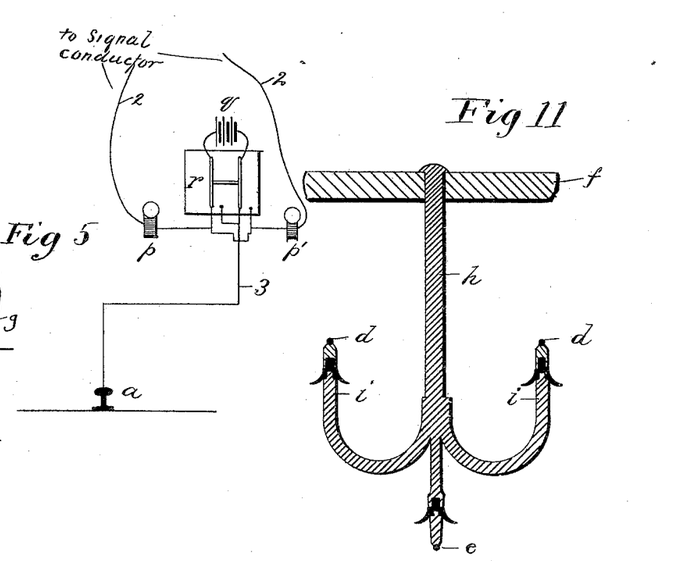
Fig. 5 is a diagram of the signaling-circuit in the locomotive cab.
Fig. 11 is a section of one of the supports or hangers for the conductors.

The parallel signaling-wires *d d* and telegraphing-wire *e* are suspended a distance above the railroad-track by suitable means, such as poles located on opposite sides of the track, carrying cross-wires, which in turn carry supports *f*, from which the hangers *g* depend, Fig. 11. Each hanger consists of the vertical rod *h*, at its upper end secured to a support *f* and at its lower portion provided with a pair of opposite and upwardly-extending lateral arms *i i*, carrying insulators at their upper ends, to which the parallel overhead signal-conductors *d d* are secured and by which they are held a suitable distance apart. The rod *h* extends down below the arms *i* and is provided with an insulator, to the lower end of which the line or telegraph conductor *e* is securely fastened, so that said telegraph-wire will be located below the plane of the signal-wires. The telegraph line-wire is continuous between any two stations, the same as a common telegraph-wire, being a "dead" wire—*i. e.*, not connected with a source of current, but adapted to be grounded at each end when in use.

The two signal-wires are insulated from each other and are each divided into non-communicating sections of a suitable length, and the sections of the two parallel wires are so arranged that they overlap—that is, the breaks between two sections of one conductor are located opposite or substantially opposite the center of a section of the other conductor. (See Fig. 3.) The object of this arrangement will be more fully explained hereinafter.

Figure 1:
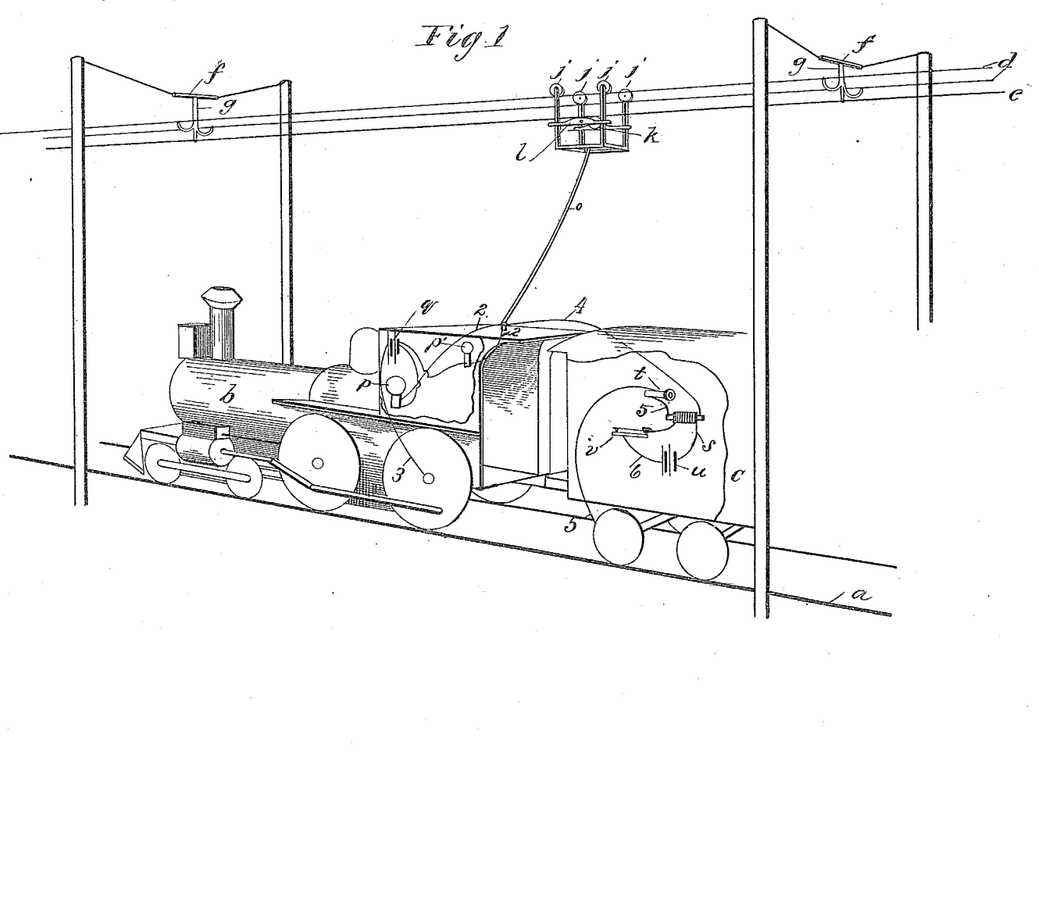
Figure 1 is a perspective view showing a locomotive and portion of a car equipped with the present signaling apparatus, and also showing the overhead conductors.
Figures 3, 4, 9, 10, 20:
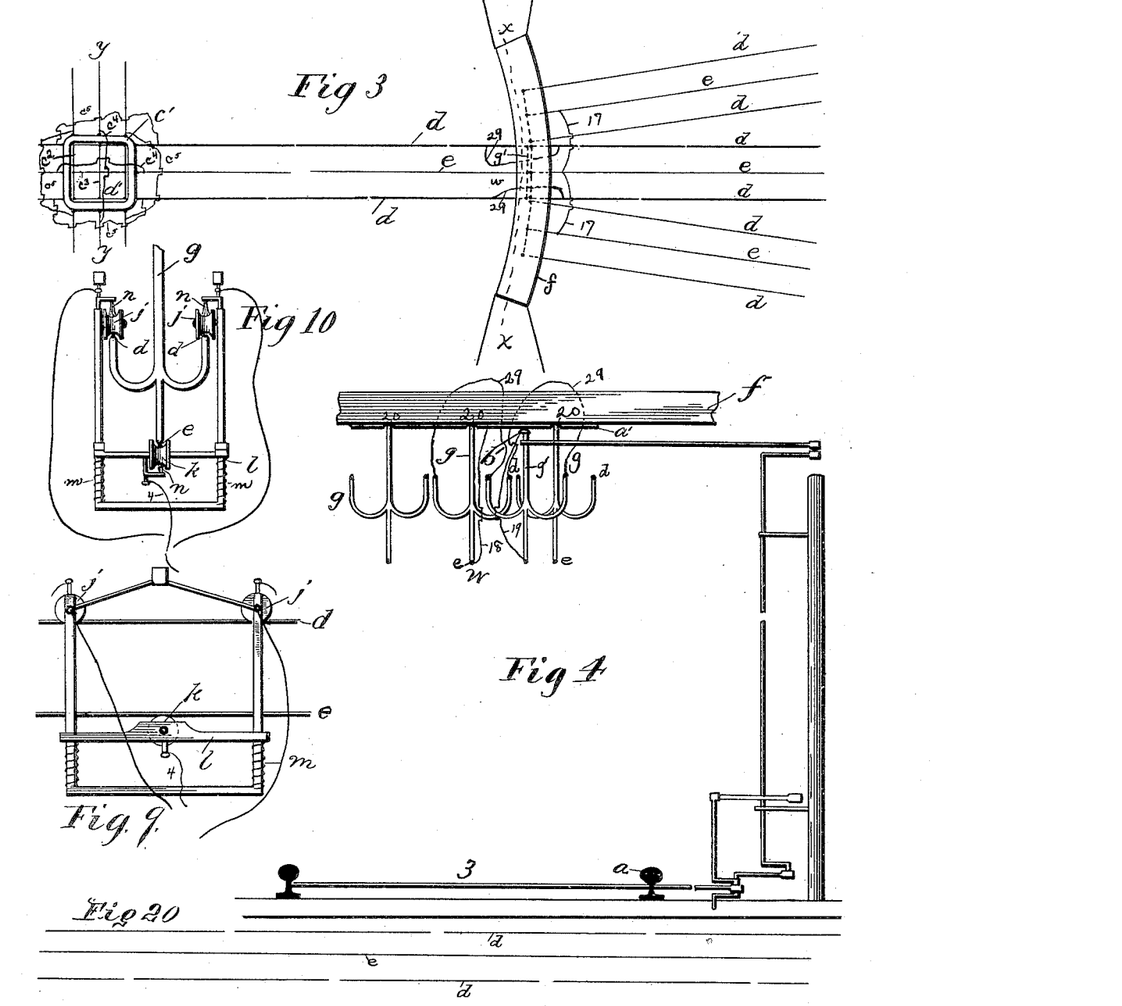
Fig. 3 is a detail plan of the overhead conductors at junction of main and side tracks, also showing a crossing for two series of intersecting conductors.
Fig. 4 is a cross-section through the overhead conductors and track, taken on plane of line *x x*, Fig. 3.
Fig. 9 is a side elevation of the trolley on the three conductors.
Fig. 10 is a vertical section of the trolley on the conductors.
Fig. 20 is a view in diagram showing the continuous telegraph-wire and the sectional overlapping signal-wires.

Each train or locomotive is provided with a traveling trolley, as shown in Figs. 1, 9, and 10, each trolley consisting of a double-U frame, the upper ends of the four arms of the frame having four vertical and flanged or deeply-grooved rollers *j*, mounted on the inner sides thereof and traveling on the two signal-wires and supporting the trolley. The upwardly-extending arms of this frame are connected at their lower ends, and the bottom of the frame is weighted to steady the trolley and hold it on the conductors. A central upwardly-springing roller *k*, constantly bearing upwardly against the line-wire, is located in the lower central portion of the trolley-frame and is carried by a vertically-movable frame *l*, supported at its ends by expansible coiled springs *m*. In order to form a more perfect connection with the conductors through the rollers than can be formed through the bearings of the rollers, each roller is preferably provided with a collecting-brush *n*, supported by a suitable holder, and the rollers bearing on each signal-conductor are connected together, but insulated from the rollers on the other conductor at any suitable points, as at the bearings of the rollers, and each pair of rollers running on the signal-wires and the telegraph-roller are provided with separate conductors insulated from each other and secured to the trolley and secured together to form a single cable *o*, by which the trolley is drawn, and which extends down and is secured to a moving vehicle on the track, such as the locomotive.

The locomotive-cab is provided with, preferably, two alarm-bells *p p'*, located on opposite sides of the cab, so that the engineer can distinguish which bell is sounding, and also with a suitable source of electricity *q*. The separate connections 2 2 from the respective contacts on the signal-conductors pass down into the cab and through the bells located on their respective sides. After passing through the bells these two connections are connected with one pole of the source, and the opposite pole of the battery is grounded through the medium of connections 3 and an axle and wheel of the locomotive and a rail of the track. The circuit in the cab is preferably provided with a pole-changer *r*, (see Fig. 5,) so that the poles of the battery, respectively connected with the ground and bells, can be reversed when the locomotive is reversed and proceeds in the opposite direction. It will thus be seen that the circuit is normally open and passes through the locomotive and is grounded, and extends through the trolley to the ends of the two signal-conductor sections, upon which the trolley is at that instant located, so that if one of said signal-conductor sections is placed in communication with the ground a circuit will be closed through the battery and a bell of the locomotive and the alarm will be sounded and the engineer notified. Thus, if two vehicles, equipped as just described, approach each other on the same track, as soon as the two trolleys engage the same signal-conductor section the circuit will be closed through both vehicles and the alarms in the same will be sounded, thereby notifying the engineers of the danger from collision in time to stop their trains.

Two separate signal-conductors divided into overlapping sections are employed, for if only one conductor was employed divided up into sections the trolleys of two approaching trains might meet at the break between two conductor-sections without notifying the engineers of the trains. It is impossible for such an accident to happen with the present arrangements.

Figures 8, 19, 21:
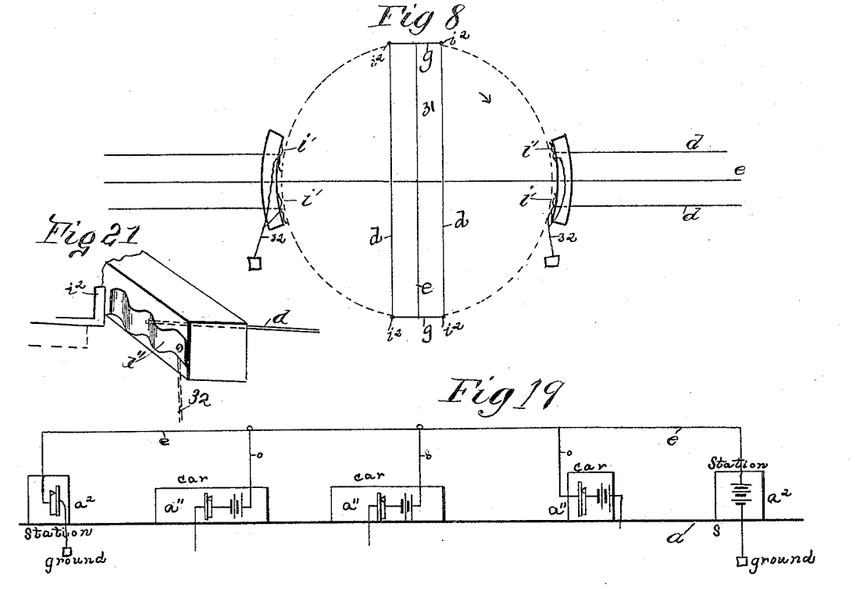
Fig. 8 is a plan of a draw-bridge provided with safety attachments to notify the engineer of an approaching train if the draw is open.
Fig. 19 is a diagram showing several cars, a station, and a line-wire, being a different system for telegraphing from that of Fig. 1.
Fig. 21 is a detail view showing the circuit-closer at a draw-bridge.

As before mentioned, the line or telegraph wire is continuous—that is, the circuit through the same is continuous—the length of the track, so that trains anywhere on the track can communicate with each other or trains can be communicated with from any station along the road. The connection 4 from the roller of the trolley running against the telegraph-line is preferably extended back to a car fitted up for telegraphing purposes, as shown in Fig. 1. This connection 4 is connected to one end of the primary coil of an induction-coil *s*, located in said car, and the other end of said primary coil is connected with the ground through the medium of connection 5 and a car axle and wheel and a rail, and said connection 5 passes through and includes a suitable microphone or other receiver *t*, conveniently located in the said car. This telegraph-car is provided with a local circuit 6, including the secondary coil of the induction-coil; also, a battery or source *u*, and a telegraph-key or other circuit closer and breaker *v*. Thus it will be seen that when the two cars, equipped as described, are in communication with the line-wire both ends of the line will be grounded through the cars and two microphones and primary coils of the induction-coils. Hence when the operator of one trains desires to communicate with the operator of the other train he simply manipulates his telegraph-key, using the Morse or any other system, as usual, thereby making and breaking the local circuit through the secondary coil, thereby inducing corresponding impulses in the primary coil of the induction-coil, which are transmitted along the line-wire to the other car and are greatly increased by the microphone or other suitable receiver in the other car, so as to be readily heard and distinguished by the operator listening at the instrument. The same arrangement can be employed when telegraphing from a station to a train. In Fig. 19 a system is shown where each car $a$ or station $a^2$ is provided with a circuit connected with the line and the ground and including a source and transmitting and receiving instruments, as usual. Thus if a person in a station wishes to telegraph to a certain train on a track where there are a number of other trains he calls to that train, and the operators on the other trains between the station and the train with which it is desired to communicate shut their instruments out, as can be readily understood.

Figures 2, 13, 14, 15, 16, 17, 18:
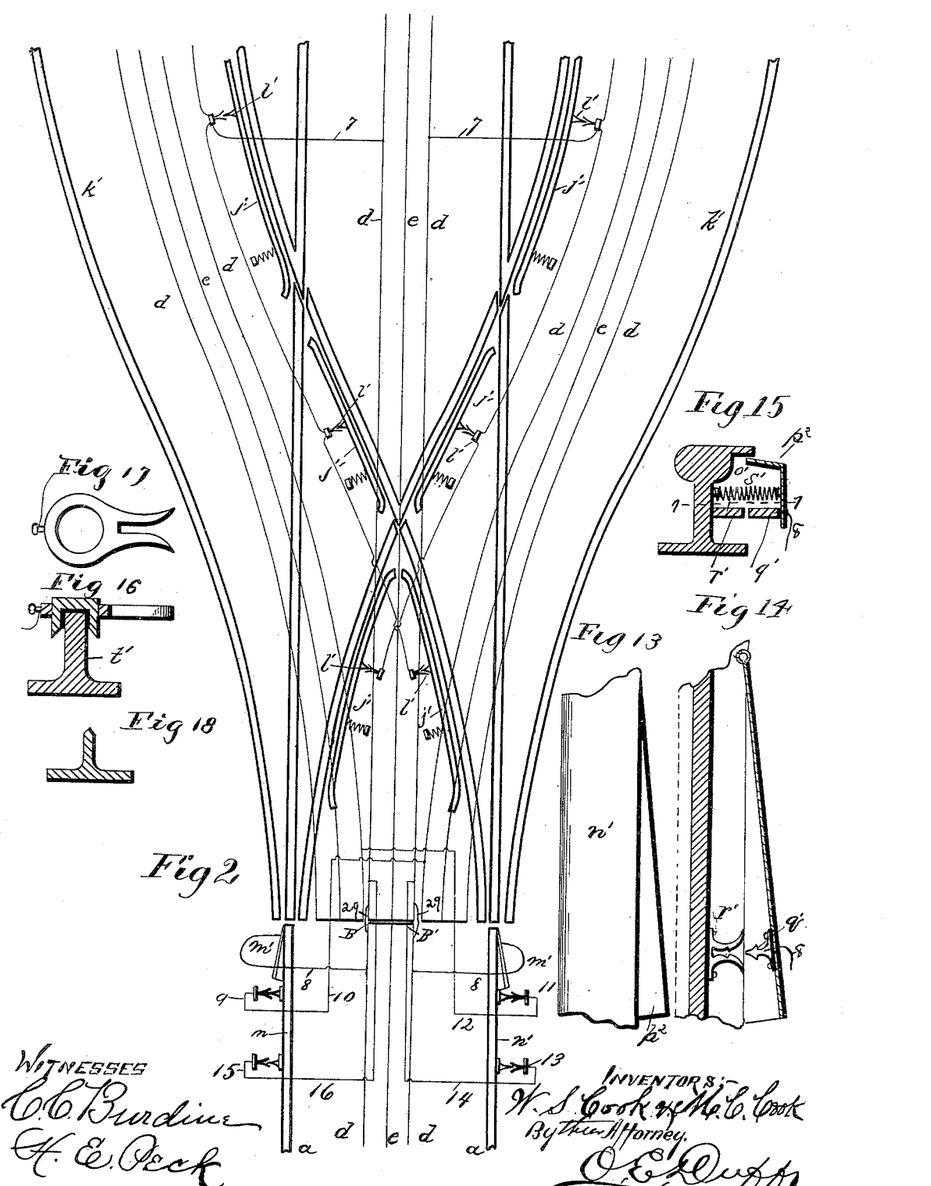
Fig. 2 is a plan of a railroad-track and the overhead conductors and safety devices at the junction of main and side tracks.
Fig. 13 is a top plan of a section of a rail provided with a circuit-closer to close a circuit when engaged by the wheel or wheels of a derailed car.
Fig. 14 is a longitudinal horizontal section of the same in plane of line 1 1, Fig. 15.
Fig. 15 is a cross-section of the construction of the two preceding figures.
Fig. 16 is a vertical section of the stationary contact of a circuit-closer and its standard.
Fig. 17 is a top plan of the stationary contact of Fig. 16.
Fig. 18 is a horizontal section of the movable contact to engage said stationary contact.

In Figs. 3 and 4 a switch for the overhead conductors is shown. Where there is a main track and two opposite branching side tracks therefrom, as shown in Fig. 2, there is a corresponding set of overhead conductors, as shown in Fig. 3. The three adjacent hangers $g$, supporting the ends of the main-line conductors and the two side-track conductors, are carried by and rigidly secured to a support $f$. The free end of the movable or switch section $w$ of the main-line conductors is located directly over and swings with the track-switch 3 of the main line, and these movable conductors at their ends, which register with the corresponding stationary ends of the before-mentioned three series of conductors, are supported by a hanger $g'$, sliding on said support $f$, so that the switch $w$ can be thrown to place the main-track conductors in continuation with either of said side-track conductors to guide the trolley of a passing train. The telegraph line-wires of the three series of conductors are all connected together by wires 17 and 18 and with a metal strip $a'$, longitudinally located on said support $f$, and the sliding hanger is provided with a spring contact-piece $b'$, connected with the telegraph line-wire of the switch by wire 19, and bearing and sliding on said metal strip $a'$, so that all the telegraph line-wires are constantly in communication. The strip $a'$ is provided with depressions 20 at each stationary hanger to receive and hold said spring-contact in electric engagement with the metal bar or strip $a'$. The main-track signal-wires are connected over the top of the switch arrangement by bridges or jumpers 29, as shown in Fig. 3, and the side-track signal-wires are insulated from the main-track signal-wires and normally grounded when not in continuity with the main-track signal-wires.

The upper end of the sliding hanger of the conductor-switch is connected in a suitable manner, as by a series of levers and rods, Fig. 4, with the track-switch, so that the conductor-switch will also be correspondingly thrown with and by the track-switch.

Figure 7:
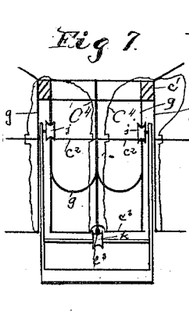
Fig. 7 is a cross-section through the conductors' crossing, taken in plane of line *y y*, Fig. 3.

In Figs. 3 and 7 a crossing is shown for two series of conductors crossing each other at an angle. This crossing consists of the open rectangular frame $c'$, suitably supported above the tracks. This frame is provided with four hangers $g$, Fig. 11, depending from its outer edges one for each of the four series of conductors radiating from the support and to which said conductors are secured. An inner corresponding series of hangers are secured to the said frame, so that each inner hanger will be located a short distance from its corresponding outer hanger, a sufficient space being left between the hangers to admit the passage of the upright arms of the trolleys. The opposite inner hangers are connected by the upper short wires $c^2$, corresponding to the signal-wires, to support the upper wheels of the trolley and with the two lower wires $c^3$, crossing each other and corresponding to the telegraph line-wires and serving to guide the contact-rollers when passing through the crossing. The wires $c^2$ form an inner square, the diameter of which is equal to the distance between the two signal-wires of each series. The telegraph-wires of each series are connected through the crossing by means of bridges or jumpers $c^4$, extending up over or around the support $c'$. Thus a trolley will pass through the crossing from any direction, as shown in Fig. 7, the upper rollers of the trolley running on two of the wires $c^2$, the sides of the trolley passing between the inner and outer hangers, and the lower roller bearing up against a wire $c^4$, rollers $j$ and $k$ jumping the narrow space between the ends of the crossing, supporting, and grounding wires and the telegraph and signal wires. At a crossing the signal-wires are connected in any suitable manner, as by jumpers or wires $c^5$.

Figure 6:
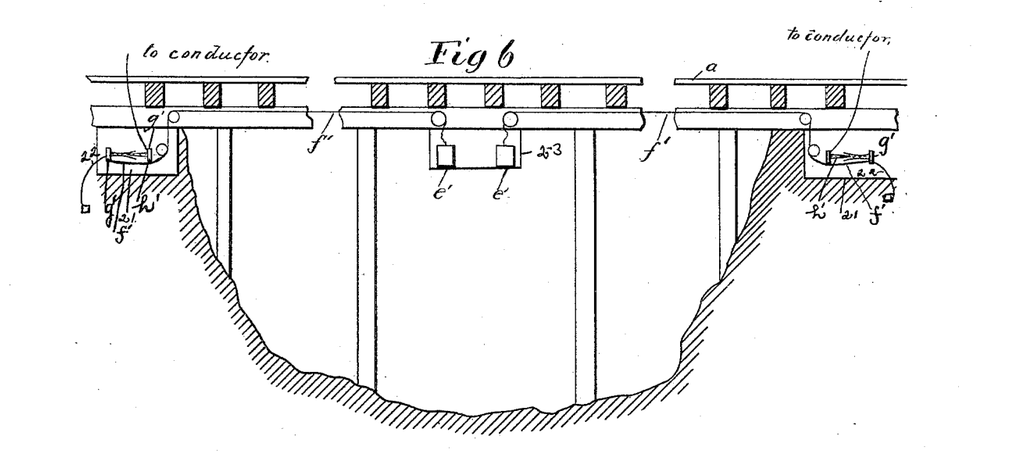
Fig. 6 is a view of a bridge provided with the safety appliance to notify the engineer of an approaching train when the bridge is destroyed.

From the foregoing it is evident that if a signal-conductor is grounded a circuit will be closed through the locomotive and the alarm sounded when the trolley of the locomotive is in contact with the said conductor. Hence, in order to notify the engineer of an approaching train if a bridge is destroyed by fire, water, or otherwise, the bridge is provided with means which ground the signal-conductors at both ends of the bridge when the bridge is destroyed. These means preferably consist (see Fig. 6) of two or more weights $e'$ $e'$, suspended near the center of the bridge by flexible connections $f'$, which extend from the weights to the shore at the opposite ends of the bridge and into boxes 21, buried beneath ground, and are each secured to a movable contact point or arm $g'$, electrically connected with the ground by wires 22, and this movable contact is adapted to be drawn into engagement with a stationary contact $h'$, connected with one of the overhead signal-conductors. Thus when the bridge is destroyed the weights drop, and by means of said suspending-connections the said circuit-closers are operated to close the circuits and ground the signal-conductors. The weights $e' e'$ rest on the bottom of a box 23, rigidly secured to the bridge, so that the connections between said weights and their respective contacts $g' g'$ are normally loose; but when the bridge sinks or is destroyed the weights drop, thereby tightening the connections $f' f'$ and drawing the contacts $g' g'$ into electrical engagement with the stationary contacts $h' h'$, with the result above noted.

Figure 12:
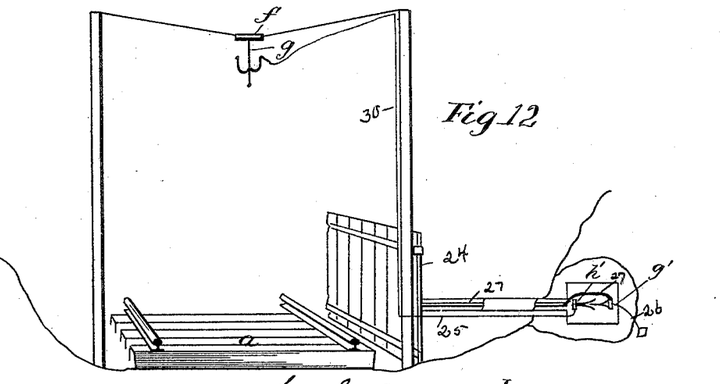
Fig. 12 is a sectional perspective of the railway-track and overhead conductors, showing a hillside broken away and a safety device to indicate on an approaching train when there is a land-slide, &c.

In Fig. 12 an arrangement is shown to notify the engineer of an approaching train if the track has been obstructed or destroyed by a land-slide or rocks, and consists of a fence or partition 24, located longitudinally along the track between the same and a hillside or the side of a deep cut, and this fence is connected at suitable intervals by flexible or rigid connections 27 with movable contacts $g'$, located in boxes buried in the hillside and adapted to electrically engage stationary contacts $h'$, the stationary contacts being electrically connected with the overhead signal-conductors by wire 30 and the movable point with the ground by wire 26, so that if there is a land-slide the fence will be swept upon the track and will operate said circuit-closers to ground the signal-conductors, whereby the engineer of an approaching train will be notified of the danger.

Fig. 8 shows the draw of a bridge. The telegraph line-wire is rendered continuous across the stream by being passed down below or above the draw. The draw 31 carries hangers provided with a section of the signal-conductors and also a line-wire for the lower contact of the trolley to travel on when passing over the draw. The two supports for the conductors at each side of the draw-opening of the bridge are provided with spring contact-arms $i'$, connected with the ground by wires 32, and so arranged with corresponding projections $i^2$ of the draw-conductor supports that when the draw is closed the spring-arms or circuit-closers will be lifted from engagement with the conductors; but when the draw is open the said arms will engage and ground the conductors, so that the alarm of an approaching train will be sounded. The projections $i^2$ are so constructed that when the draw 31 is closed they slip beneath the springs $i'$ and throw them out from connection with the signal-conductors. These springs are secured at one end, so that their free ends will normally lie in contact with the signal line-conductors, as clearly shown in Fig. 21.

It is obvious that it is the purpose of the circuit-closers formed by springs $i'$ and projections $i^2$ to ground the line-signal conductors when the draw is open, and thus notify the engineer of an approaching train. When the draw is closed, the circuit-closer is open.

A number of railroad accidents have been caused by collisions between trains passing along a main track and cars on side tracks located too near the main track.

In Fig. 2 an arrangement is shown to notify the engineer of an approaching train on the main track if a car on the side track is too close to or extending onto the main track, which consists of the bars $j'$, curved outwardly at their ends to catch the flange of the car-wheel and located at the inner side of the series of rails on one or both sides of the side track or tracks $k' k'$ at such point or points where it would be dangerous for a car on the side track to be located. These bars are held to their limit of movement toward the inner sides of the rail by springs, as shown, so that if a car passes down the track the bar will be pressed out by the flanges of the wheels, thereby operating a circuit-closer $l'$, consisting of a stationary contact, such as before described, and connected with the signal-conductor of the main track by a wire 7 and a movable contact carried by and grounded through said bar, so that the signal-conductor of the main track is grounded through said wire 7, circuit-closer, and bar, and the engineer of an approaching train notified if a car is dangerously located on the side track. Many accidents have also occured by reason of single cars on side tracks being blown or otherwise started therefrom and run toward the main track and then derailed by the switch or caused to leave the rails so as to lie across or on the main track, and thus prove an obstruction to trains passing on said track. To notify the engineer of an approaching train on the main track of such danger, circuit-closers $m' m'$ are located on the main track or switch opposite the junction of the side track or tracks and at a point to be engaged by the wheels of a car leaving the rails upon passing from a side track to the main track, and thereby ground the signal-conductors of the main track and notify an approaching train. This circuit-closer in the present instance is carried by the switch $n'$, the rails of which are slightly recessed on the outer sides of their ends at $o'$, Fig. 15, to receive the same, and said circuit-closer consists of a horizontal laterally-swinging plate $p^2$, at one end hinged to the outer side of the rail and at the inner side of its free end having a barbed contact-point $q'$, such as before described, rigidly secured to and insulated therefrom and connected electrically by wire 8 with the signal-conductor of the main line, and this contact is adapted to enter and lock itself to the stationary contact $r'$, rigidly secured to the outer side of the rail in electrical communication therewith and opposite the movable contact, said stationary contact having the shouldered spring-arms, as before described. The contact-points are held from engagement by an expansive spring s', interposed between said plate and rail, and said plate is provided with an inwardly-extending horizontal flange extending between the tread of the rail to inclose the parts from injury and keep out dirt, snow, and ice, &c.

It will be readily seen that when a car leaves the track the wheels will engage the plate $p^2$ and force the same inwardly, thereby closing the circuit-closer, and the contacts thereof are held in engagement by reason of their shape.

The fact that a great many accidents are caused by misplaced or open switches is well known, and in order to overcome this danger the switch is provided with circuit-closers, so that if the switch is in continuation with the main track a train approaching on a side track will be notified that the switch is open, or if the switch is in continuation with a side track a train approaching on the main track will be notified.

In Fig. 2 a main and two opposite side tracks are shown controlled by one switch. Hence four circuit-closers are employed, operated by the switch, two closers being located on each side of the same, each closer having one contact connected with the ground through the switch-rails and the other with a signal-conductor. Each circuit-closer consists of a contact-point, Fig. 18, rigidly secured to and in communication with the switch-rail and located opposite and adapted to enter a forked stationary contact, Figs. 16 and 17, connected with a signal-conductor and mounted on and insulated from a standard $t'$, secured to a sleeper or other suitable base beside the switch. The left-hand side of the switch is provided with a circuit-closer 9, the stationary point of which is electrically connected by wire 10 with the signal-conductor of the right-hand side track on the opposite side of the main track from the circuit-closer, and this circuit is so located that the said conductor will be open when the switch is in continuation with the said side track, but will be grounded when the switch is in continuation with the main track or with the other side track, so that if a train approaches on the said right-hand side track the engineer will be notified that the switch is open. Another circuit-closer 15 is located on the left-hand side of the switch and has its stationary point connected by wire 16 with the left-hand signal-conductor of the main line, and is so located that the said conductor will not be grounded unless the switch be thrown into continuation with the side track on that (the left-hand side) so that the engineer of an approaching train will be notified and can tell to which side the switch is thrown by observing which alarm in his cab is sounding.

A circuit-closer 13 is located on the right-hand side of the switch, and has its stationary point connected with the right-hand signal-conductor of the main line by a wire 14, and this closer is so located that it will not be closed unless the switch is thrown to the right out of continuation with the main track. The operation will be the same with this closer as with the other corresponding closer. Another closer 11 is placed on this side of the switch and has its stationary point connected by a wire 12 with the signal-conductor of the side track on the opposite or left-hand side of the main line, and this closer is so located that it will not be closed when the switch is in continuation with the left-hand side track, but will ground the signal-conductor of the left-hand side track when the switch is thrown to the right out of continuation with the same. When the switch is shifted to either side track, the movable points of the closers 9 or 11, in one case or the other, will merely enter farther between the branching arms of its respective stationary contact. The perfectness and completeness of this system are obvious.

It is evident that various changes might be made in the form, arrangements, connections, and constructions of the various parts without departing from the spirit and scope of our invention. Hence we do not limit ourselves to the exact construction and arrangement and connections herein set forth.

Having thus fully described our invention, what we claim as new, and desire to secure by Letters Patent, is—

1. A system of railway signaling and telegraphy consisting of a pair of overhead parallel signal-conductors, each signal-conductor being broken into sections, the sections of the two conductors overlapping, as set forth, a continuous overhead telegraph-wire parallel with said signal-wires, the hangers supporting said series of wires, each hanger supporting and insulating the three conductors from each other, a vehicle, a trolley traveling therewith having separate insulated contacts running on said signal-conductors and supporting the trolley and an insulated contact engaging the telegraph-wire, separate circuits from the contacts engaging each conductor to the vehicle, signaling devices in the circuits from the signal-conductors, and telegraphing devices in the circuit from the telegraph-wire, as set forth.

2. In a system of railway signaling, the pair of parallel overhead insulated conductors broken into overlapping sections, hangers for supporting said conductors, a traveling vehicle having a trolley traveling on said conductors, the contacts traveling on the two conductors being insulated from each other, separate circuits from the contacts on the two conductors grounded through the vehicles, each circuit having a separate alarm, and a source or sources of electricity in the vehicle for said circuits, substantially as described.

3. In an electric railway-signal, the combination of the two parallel signal line-conductors in substantially the same horizontal plane, the continuous telegraph line-wire parallel with and in a plane below and centrally between said signal-conductors, and the hangers supporting said wires, each hanger having two lateral arms to which the signal-conductors are secured and from which they are insulated and a central downwardly-extending arm to which the telegraph line-wire is secured and from which it is insulated, whereby all three conductors are insulated from each other.

4. In an electric railway-signal, the combination, with the two parallel overhead insulated signal-conductors, the single continuous telegraph line-wire, and the hangers supporting said wires and to which they are secured and insulated from each other, of a vehicle, a trolley drawn thereby, and consisting of a U-shaped frame carrying separate contacts traveling on said signal-wires and supporting the trolley therefrom, a contact held yieldingly bearing up against the telegraph-wire, and separate circuits for said contacts, substantially as described.

5. In railway-car telegraphy, the combination of the dead line-wire extending along the track, a traveling vehicle having a contact electrically engaging said wire, a main circuit in and grounded through said vehicle and including said contact, a microphone or like receiving-instrument in the vehicle included directly in the main circuit, an induction-coil in the vehicle, the primary of said coil being included directly in said main circuit, a normally-open local circuit in said vehicle directly including the secondary of said coil, a source of electricity in said local circuit, and a telegraph transmitting-instrument directly in said local circuit, substantially as described.

6. In a system of railway signaling, the combination of a pair of insulated separate parallel signal-conductors extending along the track and broken into overlapping sections, as set forth, a continuous insulated telegraph line-wire extending along the track, a traveling vehicle having a contact device having separate contacts insulated from each other and traveling on said signal and telegraph conductors, separate circuits from each contact grounded through the vehicle, signaling devices and a source of electricity in the vehicle in said signaling-circuits, and telegraphing devices in the vehicle in the telegraph-circuit.

7. In an electric railroad-signal, a railroad-switch, a line-conductor extending down the main track, a line-conductor extending down the side track, a normally-open circuit-closer connected with the main-line conductor to ground the same when the switch is out of continuity with the main track, and another closer connected with the side-track conductor to ground the same when the switch is out of continuity with the side track, said closers comprising stationary contacts and the switch-rails, as set forth.

8. In an electric railway-signal, the combination of a switch in the main track, a pair of separate insulated signal line-conductors extending along the main track, and stationary contacts on opposite sides of the switch, connected, respectively, with said conductors and arranged, substantially as set forth, to respectively ground said conductors when the switch is thrown in opposite directions from continuity with the main track.

9. The combination of the three parallel separate triangularly-arranged conductors, a trolley traveling thereon and having rollers running on the upper conductors, and a central roller bearing upwardly against the under side of the central conductor, substantially as described.

10. The combination, with a switch and a pointed contact secured thereto and in electric connection therewith, of a forked contact rigidly secured beside the switch and insulated from the ground and electrically connected with a signal-conductor, arranged substantially as set forth.

11. In an electric railway-signal, a rail carrying a normally-open circuit-closer consisting of a contact electrically secured to the rail and a movable contact electrically connected to a line-conductor, one of said contacts being forked and the other pointed, as and for the purpose set forth.

12. In a railroad signaling system, the combination of a main line of conductors, a side-track line of conductors, hangers carrying the same, depending from a single support, and a switch in the main line of conductors, carried by a hanger sliding on said support to place the conductors of the switch into continuation with the side-track or main-track conductors, substantially as described.

13. In an electric system of signaling for railways, the combination of a main line of conductors and a side line branching therefrom, said conductors consisting of signal-conductors and a telegraph line-wire, a support from which hangers are suspended, carrying the ends of said conductors, a metal strip on the said support, connected electrically with all the telegraph line-wires, and a switch consisting of a series of conductors adapted to be placed in continuation with the main line or the side line, and a hanger carrying the same, sliding on said support, and having means to electrically connect its line telegraph-wire with said strip, substantially as described.

14. In an electric railway-signal, a normally-open circuit-closer connected with a signal-conductor and extending along the main track to ground the same, and located beside a side-track rail at the junction of side and main tracks to be engaged and held closed by a wheel on the side track, substantially as described.

15. The combination, with two series of intersecting conductors, the conductors being in different planes, of the crossing therefor, comprising a suspended frame, an outer set of hangers to which the radiating sets of conductors are secured, a corresponding set of inner hangers, and the guiding and supporting wires connecting the inner hangers and corresponding to the conductors, the inner and outer hangers being a distance apart to admit the passage of the trolleys.

16. A normally-open circuit-closer at one end of a bridge, in combination with a connection extending along the bridge and secured to the movable contact of said closer, and provided with a weight secured to its opposite end and normally upheld near the center of the bridge, substantially as described.

17. In an electric railway-signal, a signal-conductor extending along the track, in combination with a normally-open circuit-closer in a box beside the track and connected electrically with said conductor, and a fence or the like along the track, connected with the movable contact of said closer and arranged so that when said fence is forced toward or onto the track the closer will be closed, substantially as described.

18. In an electric railroad-signal, the combination of a bridge and its draw, the overhead signal-conductors extending along the bridge up to each end of the draw, the overhead telegraph line-wire continuous across the bridge by being extended above or below the draw, the draw being provided with overhead wires corresponding to said telegraph and signal conductors to guide and support the trolleys across the same, spring contacts connected with the ground, and projections on the draw to throw said springs from contact with the signal-conductors when the draw is closed and allow them to ground said conductors when the draw is open, substantially as described.

19. A rail, in combination with a stationary contact-point secured to and in communication with the same, and a horizontal swinging plate at one end hinged to said rail and at its free end carrying a contact to engage the stationary contact when the plate is forced in by a car-wheel, substantially as described.

20. In an electric railroad-signal, a normally-open circuit-closer, in combination with a movable bar carrying the movable contact of the closer, secured to said bar in electrical communication therewith and held against a rail by a spring, so as to be pressed out by the flange of a passing wheel and close the circuit-closer, the stationary contact of the closer being formed by two branching arms insulated from the ground and secured beside said bar opposite the contact carried thereby.

21. In an electric railway-signal, an insulated signal line-conductor extending along the track, a vehicle on the track having a circuit containing signaling devices in electrical connection with said line-conductor, a source of electricity, a normally-open circuit-closer at one end of the bridge, having one of its contacts electrically connected with said line-conductor, and a connection from its movable contact extending along the bridge and arranged to close the circuit-closer when the bridge is destroyed, as and for the purpose set forth.

22. In an electric railway-signal, the combination of a bridge or trestle-work, a box or platform at or near the center of the bridge, a pair of separate weights upheld by said platform, a pair of normally-open circuit-closers respectively located at opposite ends of the bridge, circuits therefor, and flexible connections from each weight to the movable contact of a circuit-closer, substantially as described.

In testimony that we claim the foregoing as our own we affix our signatures in presence of two witnesses.

WILLIAM S. COOK.
M. CHALMER COOK.

Witnesses:
R. P. CONDON,
B. COHEN.